Figure 1:
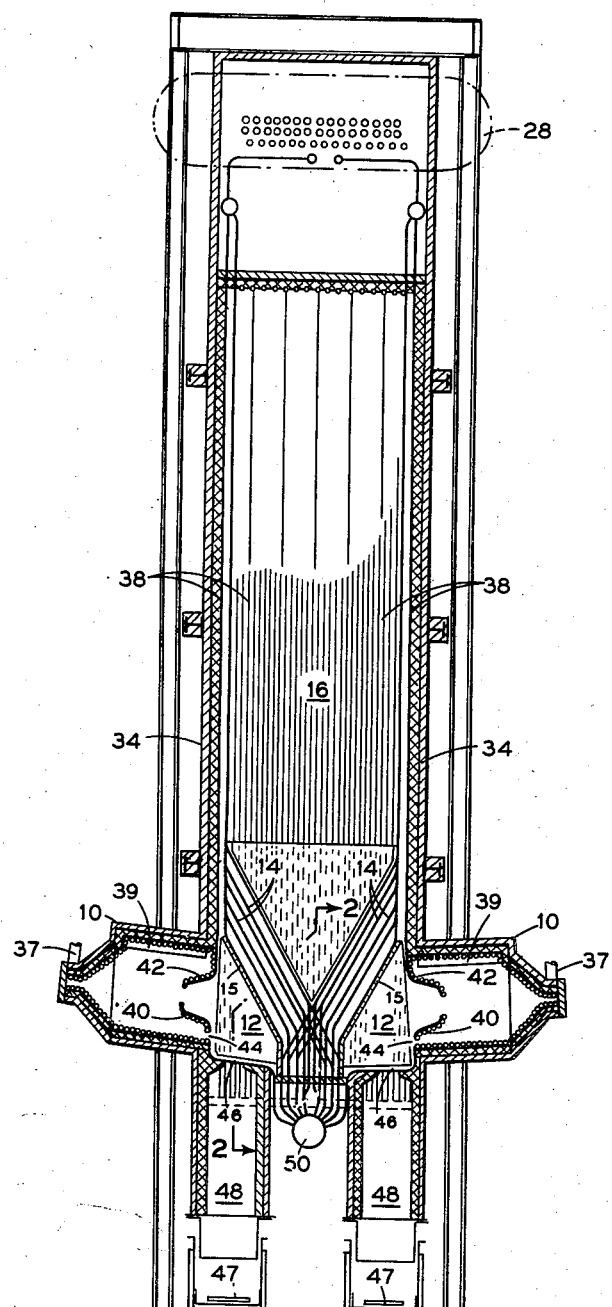

Nov. 25, 1958

H. SCHLOMBERG 2,861,553

CYCLONE FURNACE

Filed June 21, 1955

2 Sheets-Sheet 1

INVENTOR.
HERBERT SCHLOMBERG

BY

ATTORNEY

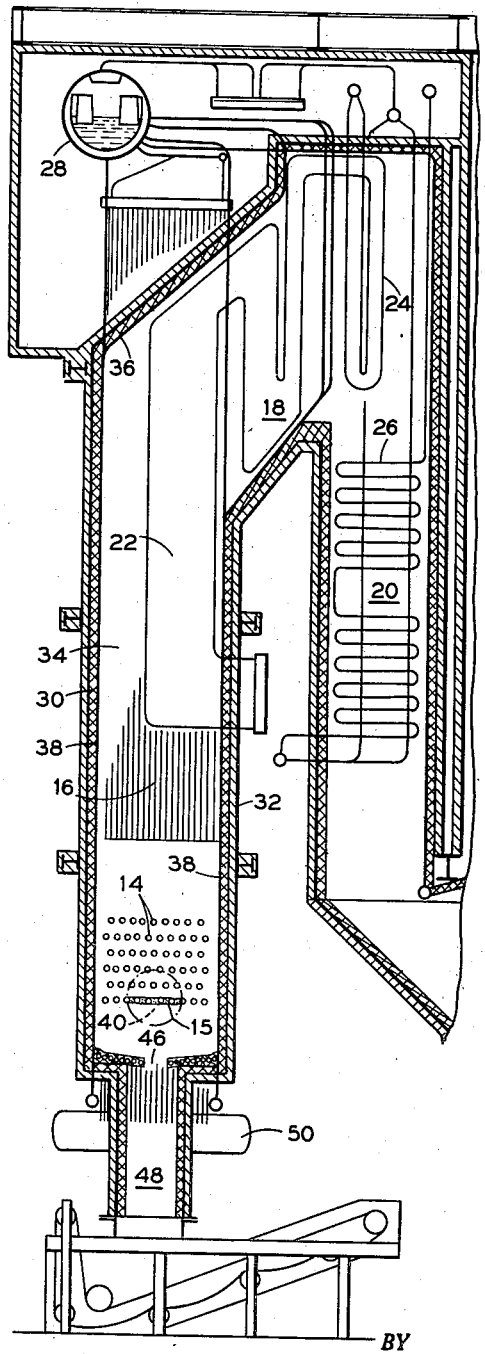

United States Patent Office 2,861,553
Patented Nov. 25, 1958

2,861,553

CYCLONE FURNACE

Herbert Schlomberg, Oberhausen, Germany, assignor to The Babcock & Wilcox Company, New York, N. Y., a corporation of New Jersey Application June 21, 1955, Serial No. 516,990

5 Claims. (Cl. 122—240)

The present invention relates to the construction and operation of fluid heating units heated by a plurality of cyclone furnaces. In such furnaces a coarsely pulverized or "granulated" slag-forming solid fuel is burned while traveling in a helical flow path in a substantially separate furnace chamber of circular transverse cross-section under combustion conditions providing a mean furnace temperature above the fuel ash fusion temperature, thus insuring the separation in and discharge of the fuel ash residue from the furnace chamber as a molten slag. Approximately 80–90% of the recoverable ash can be separated in the cyclone furnace chamber in this manner and discharged in a stream into a subjacent portion of the fluid heating unit in which the fluidity of the slag is maintained by exposure to the radiant heating effect of the high temperature gases discharging from the furnace chamber. The remaining slag particles are carried out of the furnace chamber in suspension in the outgoing high velocity gases and directed through a primary gas cooling chamber, then through a secondary gas cooling chamber of substantial length in which the gas temperature is reduced by radiant heat transfer to the fluid cooled walls of the secondary gas cooling chamber to a value below the fuel ash fusion temperature, before the gases come into contact with any convection heated fluid heating tubes.

In the operation of a cyclone furnace of the character described, the centrifugal effect on the burning fuel and air stream causes the separated slag particles to deposit in a fluid condition on the walls of the furnace chamber and form a fluid layer of slag thereon, onto which the coarser fuel particles are deposited and are burned in situ by the scrubbing action of the secondary air streams. The excess slag flows down the furnace chamber walls and collects in the lowermost section of the chamber where the slag outlet is normally located. In practice it has been found that the most efficient furnace operation in terms of fuel burning efficiency, slag separation and collection, and slag discharge, is attained when the cyclone furnace is positioned with its major axis substantially horizontal and the high temperature gases discharge through a re-entrant throat positioned in a vertical wall of the fluid heating unit and the molten slag is also discharged through said vertical wall into a subjacent chamber. Fluid heating units of this type fired by one or more cyclone furnaces are disclosed in U. S. Patents 2,357,301 and 2,594,312.

As disclosed in said prior Patent 2,594,312, the portion of the fluid heating unit between the cyclone furnace and the first bank of convection heated tubes is divided into a lower slag-collecting section and an upper gas cooling section by means of an inclined water-cooled reflecting arch and a subjacent water-cooled tube screen. With this arrangement the high temperature heating gases discharging from the cyclone furnace chamber into the adjacent slag-collecting chamber will be directed downward by the reflecting arch towards the chamber bottom. The gases then flow through the water cooled tube screen and pass upwardly through the gas cooling chamber to the convection heating section. The arch and tube screen serve two main purposes: first, to remove most of the slag particles remaining in the gases after discharge from the cyclone furnace; and, second, to maintain a gas temperature in the slag-collecting chamber sufficient to assure slag fluidity at the slag discharge taps over a wide range of operating loads.

In according with the present invention, a fluid heating unit of the character described fired by a plurality of cyclone furnaces is constructed with fluid cooled walls forming a vertically elongated chamber of horizontal cross-section, a pair of cyclone furnaces mounted in the lower portion of opposite walls thereof and at a common elevation, a part of the tubes forming said opposite walls having their lower ends bent into laterally spaced vertically staggered tube groups extending in an inwardly and downwardly direction from a point superjacent the gas outlet of each cyclone furnace and terminating in a common distribution header located below the cyclone furnace level, and with an imperforate refractory target baffle formed on the portion of the foremost row of tube so inclined and having its transverse dimension greater than the cyclone furnace gas outlet diameter and less than the dimension of said vertically elongated chamber in the plane of said baffle. With this arrangement the gases discharging from each cyclone furnace will impact on the target baffle and be deflected laterally, thus causing most of the suspended slag particles in a molten or sticky condition to adhere to the baffle face. The deposited slag flows down the target baffle to a slag collection zone exposed to the heat radiation of the discharged gases. This construction and arrangement of the slag screen and baffle provides a self-cleaning slag deposition area for effectively removing the slag particles carried out of the cyclone furnaces in suspension in the heating gases discharged and promotes slag fluidity over a wide range of loads.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a certain specific embodiment of the invention is illustrated and described.

In the drawings:

Fig. 1 is a sectional front elevation of a cyclone furnace fired steam generating and superheating unit constructed in accordance with the invention; and Fig. 2 is a sectional side elevation, the lower portion of which is taken on the line 2—2 of Fig. 1.

The natural circulation type steam generating and superheating unit illustrated comprises in general a pair of cyclone furnaces 10, slag collection chambers 12, and slag screens 14 including target baffles 15, all arranged at opposite sides of a common gas cooling chamber 16. It also comprises serially arranged convection heating passes 18 and 20 containing banks of steam superheating tubes 22, 24 and 26, the inlet of the superheater being connected to an upper steam and water drum 28 in a well-known manner. The inclined convection heating pass 18 receives heating gases from the cyclone furnaces 10 through the vertically elongated gas cooling chamber 16, which has a rectangular horizontal cross-section throughout its height and is defined by a vertical front wall 30, rear wall 32, opposite side walls 34 and inclined roof 36. The walls and roof are lined with closely-spaced steam generating tubes 38 which form the main part of the steam generating surface of the unit.

The cyclone furnaces 10 are mounted at a common elevation in the opposing side walls 34 and are arranged symmetrically about a vertical axis of the gas cooling chamber 16. Each of the cyclone furnaces is of horizontally elongated substantially circular cross-section with its major axis arranged substantially horizontal, the furnace chamber being formed by closely spaced studded tubes covered by a layer of suitable refractory material and proportioned under normal conditions of operation to maintain a furnace temperature over the designed load range above the fuel ash fusion temperature. Coarsely pulverized or "granulated" bituminous or semi-bituminous coal, carried in a stream of preheated primary air, is introduced tangentially into a fuel inlet 37 in the outer tapered end of the chamber, so as to impart a whirling motion to the coal and primary air mixture as it enters the furnace chamber. By centrifugal action the coarse particles of coal are thrown into and become imbedded in the thin layer of molten slag which is normally present on the inner surface of the furnace walls, and are burned by the scrubbing action of the high-velocity secondary air admitted tangentially through ports 39 along the furnace length in the same direction of rotation as the primary air and coal. The high velocity of the burning fuel and air causes the gas stream to follow a helical path toward the rear of the furnace where the gas is caused to reverse direction before entering a fluid cooled throat 40. The reentrant outlet throat is formed by water tubes defining the lower part of the corresponding side wall 34. The gas flow reversing action is effected by an annular pocket 42 and facilitates the separation of suspended slag particles from the outgoing gases and retards the discharge of combustibles from the cyclone furnace. The gases discharged from the throat 40 contain little, if any, combustible matter, combustion being substantially completed in the cyclone furnace. A relatively small amount of fly ash and molten particles is normally present in suspension in the outgoing gases, and this residue is largely removed in the slag collecting chamber as hereinafter described. Molten slag resulting from combustion continuously discharges through an opening 44 at the rear of each cyclone furnace and flows down to a slag pool on the floor of the slag collecting chamber 12, whence it is continuously drained through a slag tap opening 46 into a slag tank 48, along with ash and slag particles which may be separated in the chamber. A mechanical conveyor 47 conveys the cooled slag and ash from the slag tank.

The high velocity gases from each cyclone furnace 10 discharge at high velocity into the corresponding slag collecting chamber 12. A part of the tubes forming each side wall 34 are trifurcated at a point superjacent the corresponding cyclone furnace gas outlet and are bent into laterally spaced vertically staggered tube rows, each of the tubes being studded and covered with suitable refractory material in a well known manner, to define oppositely inclined relatively deep slag screens 14 extending inwardly and downwardly from the opposite side walls 34. The tubes terminate in a common distributing header 50 connected to the water space of the drum 28. As shown in Fig. 1, the oppositely inclined groups of screen tubes 14 are symmetrically arranged with respect to their common header 50, with the lower portions of the tubes in corresponding rows being offset and alternately crossing one another and entering the upper half of the header 50 throughout substantially the same circumferential area thereof. The header 50 and associated tubes occupy most of the space between the inner walls of the two slag pits 48 and any free space adjacent the floor level of the slag collecting chambers 12 is closed with suitable refractory to prevent the passage of high temperature gases therethrough. Each foremost row of screen tubes includes a target baffle 15 which is formed by applying refractory material to close the intertube spaces opposite the corresponding cyclone furnace gas outlet. Each target baffle extends from the corresponding side wall 34 down to a level opposite the floor of the corresponding slag collecting chamber 12. The intertube spaces are closed between sufficient tubes to make the transverse dimension of each target baffle greater than the maximum diameter of the corresponding cyclone furnace discharge throat 40 but less than the distance between the front and rear walls 30 and 32, thus providing a slag target area adequate to receive the impact of substantially all the gases leaving the corresponding cyclone furnace and leaving elongated gas flow spaces at opposite sides of each target baffle 15. Each target baffle thus receives the impact of the heating gases leaving a gas outlet throat 40 and causes them to flow laterally and then upwardly through the superjacent slag screen. The adhesive property of the particles and this relative abrupt change of movement of the gas stream results in most of the remaining ash and slag particles in suspension being deposited on the target baffles and from there drained downwardly through the slag tap openings 46. Each slag screen tube accumulates a layer of sticky slag which collects additional ash and slag particles from the gases, excess accumulations flowing down to the corresponding slag tap opening 46.

From the slag screens the gaseous products of combustion flow upwardly into the gas cooling chamber 16, then horizontally across steam superheater sections 22 and 24 and then downwardly over a horizontal steam superheating bank 26. After leaving the tube bank 26, the gases flow upwardly to other heat trap equipment.

With this arrangement the slag collecting zone is exposed to heat radiation from and swept by the discharging gases and to re-radiation from the target baffle. The radiation loss to the surface in the gas cooling chamber is relatively low because of the shield formed by the target baffle, thus resulting in relatively high gas temperatures in the slag collecting chamber and slag fluidity over a wide range of loads. The present arrangement also permits operation with one cyclone at partial capacity without encountering slag flow difficulty.

While in accordance with the provisions of the statutes I have illustrated and described herein the best form of the invention known to me, those skilled in the art will understand that changes may be made without departing from the spirit of the invention covered by my claims, and that certain features of my invention may sometimes be used to advantage without a corresponding use of other features.

What is claimed is:

1. A fluid heating unit comprising a convection heated fluid heating section, walls including fluid heating tubes defining a vertically elongated rectangular chamber, a pair of cyclone furnaces arranged at opposite sides of said rectangular chamber, each of said cyclone furnaces having a circular transverse cross-section and arranged with its major axis substantially horizontal, means for burning a slag-forming solid fuel in said cyclone furnaces under a mean furnace temperature above the fuel ash fusion temperature, means forming a restricted outlet at one end of each of said cyclone furnaces for the discharge of high temperature high velocity heating gases carrying slag particles in suspension, a distributing header located below the level of said cyclone furnaces, a portion of said fluid heating tubes of opposite walls having their lower ends bent to define oppositely inclined slag screens extending inwardly and downwardly from a position superjacent the corresponding cyclone furnace gas outlet and terminating in said distributing header, and an imperforate refractory faced target baffle supported on the row of said slag screen tubes nearest to and opposite each of said cyclone furnace gas outlets.

2. A fluid heating unit comprising a convection heated fluid heating section, walls including fluid heating tubes defining a vertically elongated rectangular chamber, a pair of cyclone furnaces arranged at opposite sides of said rectangular chamber, each of said cyclone furnaces having a circular transverse cross-section and arranged with its major axis substantially horizontal, means for burning a slag-forming solid fuel in said cyclone furnaces under a mean furnace temperature above the fuel ash fusion temperature, means forming a restricted outlet at one end of each of said cyclone furnaces for the discharge of high temperature high velocity heating gases carrying slag particles in suspension, a distributing header located below the level of said cyclone furnaces, a portion of said fluid heating tubes of opposite walls having their lower ends bent to define oppositely inclined slag screens extending inwardly and downwardly from a position superjacent the corresponding cyclone furnace gas outlet and terminating in said distributing header, and an imperforate refractory faced target baffle supported on the row of said slag screen tubes nearest to and opposite each of said cyclone furnace gas outlets and having a minimum width greater than the diameter of the corresponding cyclone furnace gas outlet and extending downwardly from a position superjacent said gas outlet to a point below the level of the corresponding cyclone furnace.

3. A fluid heating unit comprising a convection heated fluid heating section, walls including fluid heating tubes defining a vertically elongated rectangular chamber, a pair of cyclone furnaces arranged at opposite sides of said rectangular chamber, each of said cyclone furnaces having a circular transverse cross-section and arranged with its major axis substantially horizontal, means for burning a slag-forming solid fuel in said cyclone furnaces under a mean furnace temperature above the fuel ash fusion temperature, means forming a restricted outlet at one end of each of said cyclone furnaces for the discharge of high temperature high velocity heating gases carrying slag particles in suspension, a distributing header located on a vertical axis of said chamber and below the level of said cyclone furnaces, a portion of said fluid heating tubes of opposite walls having their lower ends bent into laterally spaced vertically staggered tube groups to define oppositely inclined slag screens extending inwardly and downwardly from a position superjacent the corresponding cyclone furnace gas outlet and terminating in said distributing header, and an imperforate refractory faced target baffle supported on the row of said slag screen tubes nearest to and opposite each of said cyclone gas outlets and having a minimum width greater than the diameter of the corresponding cyclone furnace gas outlet and less than the width of said chamber and extending downwardly from a position superjacent said gas outlet to a point below the level of the corresponding cyclone furnace.

4. A fluid heating unit comprising a cyclone furnace of substantially circular cross-section arranged with its major axis substantially horizontal and having a restricted gas outlet at one end thereof, means for burning a slag-forming fuel in said cyclone furnace at a normal mean temperature above the fuel ash fusion temperature, walls including fluid heating tubes defining a vertically elongated chamber having a lower portion opening to and directly receiving gases discharging from said gas outlet, a portion of said fluid heating tubes of one wall having their lower ends bent to define a slag screen extending inwardly and downwardly from a position superjacent said gas outlet, an imperforate refractory faced target baffle opposite said gas outlet supported by some of said slag screen tubes and arranged to receive the impact of a major portion of the slag particles remaining in suspension in the gases discharging from said gas outlet, said baffle extending downwardly from a position superjacent said gas outlet to a point therebelow and having its upper and lower ends contacting spaced wall portions of said chamber, said baffle having a width greater than the width of said gas outlet and less than the width of said lower portion of said chamber and having its sides cooperating with wall portions of said chamber to provide passages for the flow of gases through the slag screen to the upper portion of said chamber, and a slag outlet in said chamber below the level of said cyclone furnace.

5. A fluid heating unit comprising a cyclone furnace of substantially circular cross-section arranged with its major axis substantially horizontal and having a restricted gas outlet at one end thereof, means for burning a slag-forming fuel in said cyclone furnace at a normal mean temperature above the fuel ash fusion temperature, walls including fluid heating tubes defining a vertically elongated chamber having a lower portion opening to and directly receiving gases discharging from said gas outlet, a distributing header located below said cyclone furnace, a portion of said fluid heating tubes of one wall having their lower ends bent to define a slag screen extending inwardly and downwardly from a position superjacent said gas outlet and terminating in said distributing header, an imperforate refractory faced target baffle opposite said gas outlet supported by some of said slag screen tubes and arranged to receive the impact of a major portion of the slag particles remaining in suspension in the gases discharging from said gas outlet, said baffle extending downwardly from a position superjacent said gas outlet to a point therebelow and having its upper and lower ends contacting spaced wall portions of said chamber, said baffle having a width greater than the width of said gas outlet and less than the width of said lower portion of said chamber and having its sides cooperating with wall portions of said chamber to provide passages for the flow of gases through the slag screen to the upper portion of said chamber, and a slag outlet in said chamber below the level of said cyclone furnace.

References Cited in the file of this patent

UNITED STATES PATENTS

| | | |
|---|---|---|
| 2,357,301 | Bailey et al. | Sept. 5, 1944 |
| 2,731,955 | Lenhart et al. | Jan. 24, 1956 |
| 2,774,339 | Junhermann | Dec. 18, 1956 |